July 28, 1936.                    H. SHOKLER                    2,048,954
                                    CHART
                               Filed June 8, 1932                2 Sheets-Sheet 1
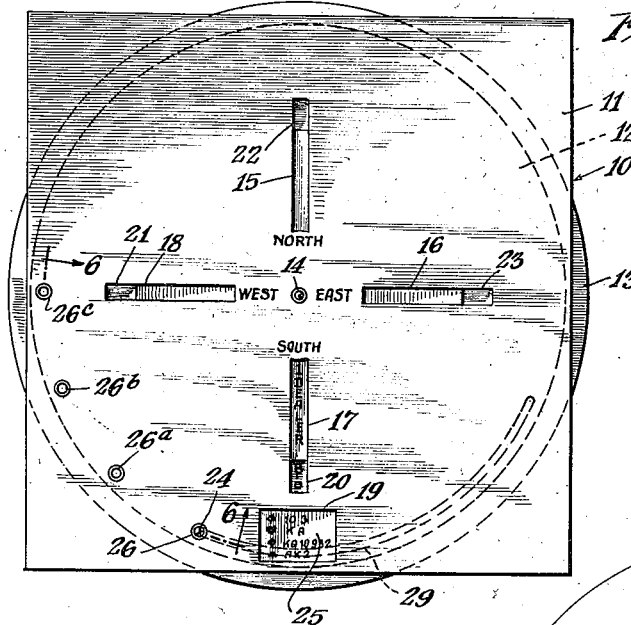
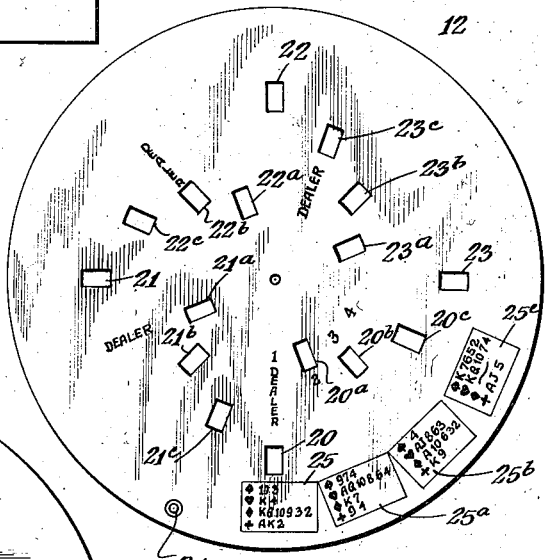
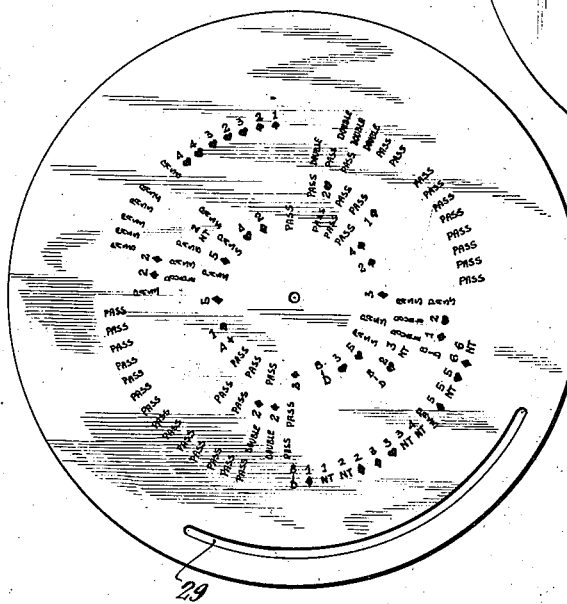
INVENTOR
*Harry Shokler*
BY
*Hoguet & Neary*
ATTORNEYS July 28, 1936.  H. SHOKLER  2,048,954
CHART
Filed June 8, 1932  2 Sheets-Sheet 2
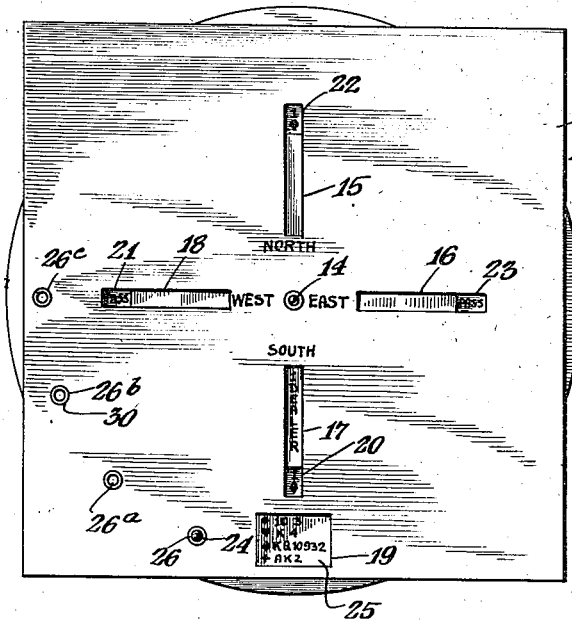
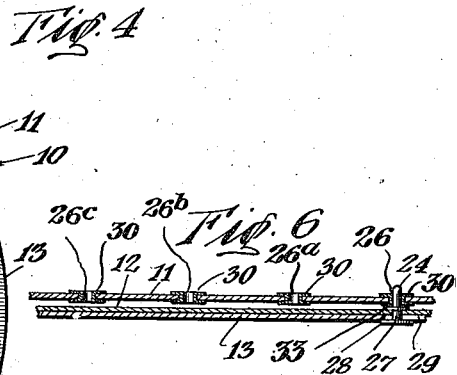
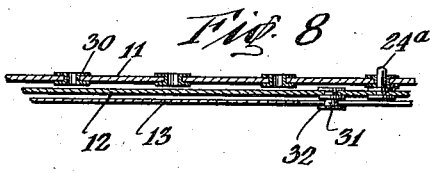
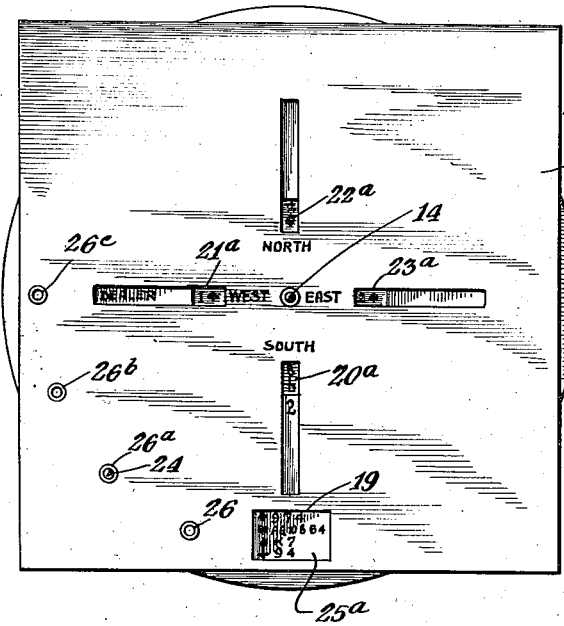
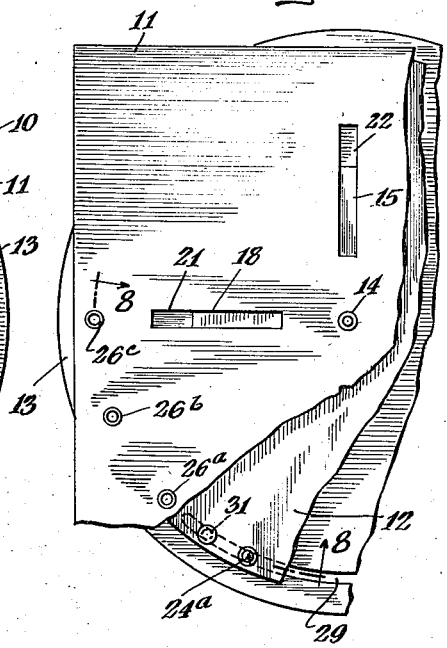
INVENTOR
*Harry Shokler*
BY
*Hoguet & Neary*
ATTORNEYS Patented July 28, 1936

2,048,954

UNITED STATES PATENT OFFICE 2,048,954

CHART

Harry Shokler, Brooklyn, N. Y.

Application June 8, 1932, Serial No. 616,029

9 Claims. (Cl. 35—8)

This invention relates to a chart for instruction and similar purposes. More particularly, the invention has reference to a chart wherein a plurality of quadrangular cards, discs or other plane surfaced members (or combinations of members of different shapes) are so associated as to be rotatable relatively the one to the other to bring indicia carried by certain of the members into line with openings provided in certain other of the members according to some predetermined arrangement.

I am aware of the fact that others have associated two discs, one of which carries suitably spaced indicia, such as population and geographical data, and the other is provided with openings adapted when one of the discs is rotated to bring the openings and certain of the indicia into the desired juxtaposition to expose such indicia to the view of the operator while concealing the other indicia. My invention is an improvement over charts of this type in that it makes possible a many fold multiplication of the possibilities for indicating to the operator different facts concerning a single subject of investigation while at the same time reducing the number of indicia exposed at any one time. In this way the field of usefulness of the device is increased and at the same time its efficiency as a means of instruction is increased because the attention is more easily and singly focused upon each particular fact or item of information in turn out of the presence of the others.

A further advantage of my invention as compared with the devices heretofore proposed resides in the fact that it makes possible the presentation of data bearing upon a particular subject which is derived as the resultant of the effect of a plurality of independent variables working in conjunction with or upon the particular subject under consideration under a particular set of circumstances. This feature of the invention not only permits of the working out by manipulation of the chart of more intricate problems than is possible with the charts heretofore employed, but also makes it possible for the operator to test his ability in solving a more or less complicated set of problems normally requiring for their solution the cooperation and active participation of one or more other individuals, all under conditions similar to those that would be presented were such individuals actively participating. This feature of my invention is capable of wide application not only in statistical and instruction charts but also in similar structures made up to be operated as a game or puzzle.

Another feature of my invention resides in a novel means for holding two or more discs or similar plane surfaced members in certain predetermined positions while manipulating a third or other discs forming a part of the assembly.

While applicable in many other situations as above indicated, my improved chart is particularly suitable as a means of instructing persons in the correct playing or bidding of card games, such for example, as contract bridge. The invention will be more fully understood by reference to the accompanying drawings wherein I have shown by way of example a bidding chart for contract bridge embodying the principles of my invention. In the drawings:

Fig. 1 is a top plan view of the assembled chart;

Figs. 2 and 3 are plan views of the second and third plane surfaced members or discs used in making up the assembly;

Fig. 4 is a plan view similar to Fig. 1 but with the lower disc manipulated to register the initial bid of the operator and the next succeeding bids of the other hands;

Fig. 5 is a plan view similar to Fig. 1 but with the upper disc rotated to show the positions of the parts, the initial bids of the hidden hands and as well the hand of the operator at the stage when it is his turn to make his initial bid;

Fig. 6 is a sectional view taken on the line 6—6 of Fig. 1 and illustrating the means for holding the two uppermost discs in registry upon a given subject or station while manipulating the lower disc;

Fig. 7 is a fragmentary top plan with a portion broken away of the chart showing a modified form of the means for holding certain of the members making up the chart in predetermined relation to one another;

Fig. 8 is a section taken on the line 8—8 of Fig. 7.

Referring to the drawings, 10 designates generally the chart assembly consisting of a plurality of plane surfaced members 11, 12 and 13 secured to and adapted to be rotated about a common pivot 14. The plane surfaced members may be made of any suitable material, for example cardboard having some degree of flexibility, and may be disc-shaped, square or octagonal or of other suitable form as desired. The superimposed member 11 is shown as provided with four openings 15, 16, 17 and 18 equi-distantly positioned from the center and from each other and representing respectively the stations "North", "East", "South" and "West" of the players in a game of bridge. In the assembly these openings expose portions of the member 12 and, in addition, when brought into certain predetermined positions with respect to the member 12 the openings 15, 16, etc. coincide with similar openings 20, 20a, 20b, 20c, 21, 21a, 21b, 21c, 22, 22a, 22b, 22c, 23, 23a, 23b, and 23c formed in the member 12. These last-mentioned openings are so positioned on the member 12 as to be brought into coincidence with certain restricted portions of the lower disc 13 carrying indicia representing various bids that may be indicated in the course of the manipulation of the chart. It will be observed that these indicia are disposed in four concentrically related circles corresponding to the number of different sets of hands that are set up on the chart. It will be understood that this number may be increased within limits set by the permissible diameter of the chart. The number and relative positions of the indicia will be varied in the respective circles according to the predetermined distribution of the cards in the hands of the silent or automatic bidders and the hand of the person operating the chart. In any given circle the respective indicia are so disposed relative to one another that, regardless of whether or not the player makes the correct bid, either in starting the bid or at a later point in the bidding, the indicia indicating the correct bids in response thereto will be automatically brought into exposed position in the respective openings of the chart at the positions of the silent bidders,—in the drawings, the positions West, North and East.

The member 11 is provided with still another opening 19 positioned adjacent the edge and adapted by rotation relative to the second member 12 to bring spaced portions of the surface of the member 12 into view. These spaced portions are shown as carrying groups of indicia 25, 25a, 25b and 25c representing hands that would be held by the person operating the chart. Four hands are shown but this number may be increased or decreased if desired.

In order to hold the members 11 and 12 in a predetermined position for bidding a given set of hands, I provide a novel arrangement of means, one embodiment of which is shown more particularly in Figs. 1 to 6. This comprises a stud 24 secured to and protruding above the member 12, and adapted to fit in any one of a predetermined number of openings 26, 26a, 26b, and 26c disposed adjacent the periphery of the member 11. These openings are shown as spaced along the arc of a circle at such distances apart as to insure that when the stud 24 is fitted into any selected one of the openings 26, 26a, etc., the opening 19 will be disposed in coincidence with one of the groups of indicia 25, 25a, 25b, and 25c carried by the member 12. Each one of the four positions that may be thus assumed by the stud 24 brings to the view of the person operating the chart one of the four hands that he is to bid. As shown in the drawings, when the stud is brought into coincidence with the opening 26, the initial bid will devolve upon the operator, he being considered the dealer, and the openings 21, 22 and 23 will expose blank spaces on the member 12. When the stud is brought into coincidence with the opening 26a, West will be considered the dealer and the openings 21a, 22a and 23a will expose indicia representing the correct succession of bids according to the system being illustrated for the hands of the silent or automatic bidders, West, North and East. The opening 20a may expose merely a blank space, or the word "Bid," thus indicating to the operator that the problem before him is to bid his hand according to his knowledge of the system and in view of the information conveyed to him by the automatic bidding of the other hands. Similarly, when the stud is brought into coincidence with the opening 26b, North is the dealer and the openings 22b and 23b will expose indicia representing the correct bids of North and East. Opening 21b will expose a blank space and 20b will expose the word "Bid." When the stud is brought into coincidence with the opening 26c, East is the dealer. The opening 23c will expose indicia representing the correct bid of East, the openings 21c and 22c will expose blanks and 20c will expose the word "Bid."

According to the modification of the holding or positioning means shown more particularly in Fig. 6, the lower end of the stud 24 extends as at 27 beyond the lower side of the member 12 and terminates with a flattened shoulder portion 28 which is adapted to be brought through an arcuate slot 29 formed in the member 13 near its periphery and to engage with the portions of the member 13 adjacent the slot. In this way the rotation of the member 13 with respect to the members 11 and 12 is limited and the bringing of incorrect indicia into alignment with the openings 20, 21, etc. is prevented. Intermediately of its length the stud 24 is provided with a shoulder 33 which engages the upper side of the member 12 and is spaced from the shoulder 28 a sufficient distance to permit the members 12 and 13 to fit therebetween. Because of the shoulders 33 the stud 24 is in effect secured to the member 12 and so associated with the member 13 as to permit the latter to move relatively to the member 12 within the limits of the arcuate slot 29. With a view to preserving the original shape of the openings 26, 26a, etc. and to prolong the operating life of the chart, suitable metal eyelets 30 may be inserted in the openings 26, 26a, etc.

Instead of limiting the rotative movement of the member 13 through the medium of the stud 24, I may provide a separate stud member such as 31 shown in Figs. 7 and 8. This stud member is secured to the intermediate disc member 12 and extends downwardly and terminates in a shoulder portion 32 adapted to be fitted through and engage with the arcuate slot 29 in the member 13. When the stud member 31 is used, the stud temporarily connecting the members 11 and 12 will assume the form of 24a;—that is to say, it will not extend below the lower face of the member 12.

Having described the structure of the above-described embodiment of my invention, I will now describe its operation:

Four sets of hands having a predetermined distribution of the cards are selected. The respective hands of the four sets that are to be disclosed to and bid by the person operating the chart will be indicated as at 25, 25a, etc. on the disc member 12 in position to be brought into view through the opening 19 when the stud 24 is brought into coincidence with the respective controlling openings 26, 26a, 26b and 26c. Indicia representing the correct bids for the hands allotted to West, North and South for the several sets of hands will be disposed upon the member 13 in position to be brought into coincidence with the openings 21, 22, 23, etc. under the conditions of operation.

For the purposes of illustration, let us start with South as the dealer and the assembled members in the position shown in Fig. 1. In this position the stud 24 is fitted in the opening 26 and has its shoulder portion 28 at one end of the slot 29. Let us assume that the player bids 1-diamond. He moves the disc 13 clockwise to the point where the indicia for a 1-diamond bid carried by the member 13 is exposed through the opening 20 in the superimposed member 12. This will expose a "Pass" at West, a 1-spade bid at North and a "Pass" at East, the members now assuming the position shown in Fig. 4. Let us assume that the bidder then chooses to bid 2-diamonds. He then moves the disc 13 further in the clockwise direction until the indicia for a 2-diamond bid appears. This will expose a "Pass" at West, a 2-heart bid at North and a "Pass" at East. Having thus been informed as to the support that may be depended upon from his partner in hearts and spades, the player then bids 3-no trump by moving the disc 13 still further in the clockwise direction and the correct indicia appears. This will expose a "Pass" at West, a 4-heart bid at North and a "Pass" at East. With the assurance thus given of the strong heart support by his partner the player then bids 4-no trumps in the same manner as before. This will expose "Passes" at all three of the other stations and concludes the bidding.

Let us assume now that West is the dealer in this bidding test problem. The stud 24 is brought into engagement with the opening 26a and the disc 13 is rotated until the word "Bid" appears in the opening 20a at South. Other means for determining when the discs are brought to the starting position may be employed, such for example as so positioning the slot 29 that when the shoulder has moved to the end of the slot the disc 13 will have been brought to the desired starting position. In the example under consideration, with West the dealer the chart assembly will appear at the start of the operation as illustrated in Fig. 5. West having bid 1-spade, North 2-diamonds and East 2-spades. Let us assume that the player wishes to bid 3-hearts. He rotates the disc 13 as before bringing the indicia for 3-hearts into exposed position at South. This exposes a 4-club bid at West, a 4-heart bid at North and a 4-spade bid at East. The player then bids 5-hearts, moving the disc 13 to bring the 5-heart indicia into view. This exposes "Passes" at all the other bidding stations and closes the bidding.

The above examples have been worked out on the assumption that the player shall have bid his hand correctly. Let us assume in the case of the last set of hands that the player on his first opportunity at bidding bids incorrectly 3-diamonds. This does not prevent the proper functioning of the chart. Movement of the disc to expose a 3-diamond bid has the effect of exposing a 3-spade bid at West, a 5-diamond bid at North and a "Pass" at East. Let us assume that the player then passes. He indicates this by moving the disc 13 counterclockwise until the word "Pass" is exposed at South. This will expose "Passes" at all of the other positions thus closing the bidding with North identified as the "Declarer." Irrespective of whether the player bids correctly or incorrectly the bids that correctly represent the bidding of the cards at the other stations under the circumstances will be brought out and if the player continues bidding a declaration will eventually be made.

It is to be understood that a separate booklet or other printed matter containing analyses of the several sets of hands with an indication of the correct bids of the several hands,—the exposed hand of the player and the hidden hands— will ordinarily be provided. Reference to these analyses may be had after the termination of the bidding. In this application of the principle of the invention, the device may be looked upon as a bid test chart. The chart is adaptable for use in instructing players according to any of the systems of playing contract and other forms of bridge now in vogue.

In order to increase the range of usefulness of the chart without unduly increasing its size, additional discs generally similar to discs 12 and 13, having disposed thereon the indicia appropriate for still other sets of hands may be substituted for those in the original assembly. When this is contemplated, it will be preferable to provide a pivoting member 14 that is easily removed and reinserted.

While I have described the invention with particular reference to its application in instructing persons in the technique of bidding that is normally encountered in playing contract bridge, it will be understood that the principles of the invention are capable of many other applications. These applications include, for example, various forms of games, statistical work and mathematical computations of various kinds and other educational and instruction devices. It will also be understood that the normally exposed surfaces of the plane surfaced members may be used to carry advertising matter of various kinds. It will be understood that various changes may be made in the shape and arrangement of the parts without departing from the scope of my invention which is not to be deemed as limited other than as indicated in the appended claims.

I claim:

1. A chart comprising a plurality of plane surfaced members, a pivot, said members being secured in superimposed relation by and rotatable about said pivot, the uppermost of said members being provided with openings radially aligned with said pivot through which to expose portions of the surfaces of the lowermost member and of an intermediate member, said intermediate member being formed with openings alignable with said openings in said uppermost member for viewing the lowermost member and having disposed thereon a plurality of groups of indicia representing subjects to be illustrated and adapted to be selectively and singly brought into coincidence with and exposed through openings in said uppermost member, the lowermost of said members having a plurality of spaced indicia disposed on portions thereof that are so spaced radially from said pivot that they are adapted to be selectively brought into coincidence with and exposed through openings in said uppermost member, means on said uppermost member and means on said intermediate member adapted to be interengaged for holding said uppermost and intermediate members in fixed relation to one another while permitting relative movement between said members and another member of said assembly.

2. A bid-test chart comprising a plane surfaced member carrying indicia representing a plurality of bids, said indicia being arranged on said member in a plurality of concentrically disposed circles, a second plane surfaced member superimposed upon and secured in rotative relation to said first-mentioned member, said second member carrying adjacent the edge thereof a plurality of groups of indicia representing hands to be bid by the player and being provided with radial openings so spaced in several circumferentially disposed series as to be brought into coincidence with selected bid indicia carried by the first member, a third plane surfaced member the entire surface of which is superimposed upon and secured in rotative relation to said second member and having openings disposed in equispaced relation to represent the stations of the several players in a game of cards and further so disposed as to be brought into coincidence with any circumferential series of the radial openings provided in said second member, said third member being provided with still another opening adapted on rotation of said member relative to said second member to be brought into coincidence with selected ones of the groups of indicia representing hands to be bid that are carried by said second member.

3. A chart comprising a plurality of plane surfaced members associated in superimposed relation and adapted to be rotated relatively to one another about a common center, and interengageable means on certain of said members for holding them in fixed relation to one another while permitting relative movement between said members and another member of the assembly, said means being adapted to be released from holding engagement with one of said members.

4. A chart comprising a plurality of plane surfaced members associated in superimposed relation and adapted to be rotated relatively to one another about a common center, and means for releasably holding certain of said members in fixed relation to one another while permitting relative movement between said members and another member of the assembly, said means comprising a stud member secured to one of said members and extending from the surface thereof into the plane normally occupied by an adjacent member, said adjacent member being provided with a plurality of spaced openings adapted to be selectively brought into register with said stud member.

5. In a device of the character described; a member bearing indicia arranged in a plurality of spaced series; a second member superimposed on said first member and formed with an opening registerable with indicia in each of said series on said first member and another opening registerable with other indicia individually related to the respective indicia series, all of the said superimposed member extending over said indicia bearing member so that said indicia are visible only through said opening, a member positioned intermediate said first and second members and bearing the said indicia related to all said series disposed thereon to be selectively viewed through said last mentioned opening in said second member, said intermediate member being formed with a series of offset openings spaced in one direction in accordance with the spacing of the series of indicia on said first member, said second and intermediate members being relatively adjustable for registering the said other opening in said second member with indicia on said intermediate member relating to one of the series of indicia on said first member and for aligning one of the openings of said series in said intermediate member with the first mentioned opening in said second member to restrict observation therethrough to the series of indicia on said first member that corresponds to the indicia on said intermediate member that is observable through said other opening in said second member; and means for mounting said first member for movement relatively to said second and intermediate members for selectively exposing all the data in said one series thereon through the aligned openings in said second and intermediate members.

6. In a device of the character described; a member bearing indicia arranged in a plurality of spaced series; a second member superimposed on said first member and formed with an opening registerable with indicia in each of said series on said first member and another opening registerable with other indicia individually related to the respective indicia series; a member positioned intermediate said first and second members and bearing the said indicia related to all said series disposed thereon to be selectively viewed through said last mentioned opening in said second member, said intermediate member being formed with a series of offset openings spaced in one direction in accordance with the spacing of the series of indicia on said first member, said second and intermediate members being relatively adjustable for registering the said other opening in said second member with indicia on said intermedate member relating to one of the series of indicia on said first member and for aligning one of the openings of said series in said intermediate member with the first mentioned opening in said second member to restrict observation therethrough to the series of indicia on said first member that corresponds to the indicia on said intermediate member that is observable through said opening of said second member; means for mounting said first member for movement relatively to said second and intermediate members for selectively exposing all the data in said one series on said first member through the aligned openings in said second and intermediate members; means on said intermediate member and means on said second member adapted to be interengaged for holding the intermediate and second members in their adjusted relation during movement of said first member to expose all the indicia of the series thereon corresponding to the relative adjustment of said second and intermediate members.

7. A device for simultaneously selecting a plurality of functionally related indicia from a mass of indicia comprising a member bearing indicia arranged in a plurality of spaced series; a second member superimposed on said first member and formed with a plurality of spaced openings extending across all said series of indicia for registration with indicia in all said series at a plurality of non-contiguous points in each of said series on said first member and also provided with another opening for selective registration with other indicia individually related to the respective indicia-series on said first member; a member positioned intermediate said first and second members and bearing the said indicia related to said respective series disposed thereon to be viewed through said other opening in said second member and formed with a plurality of series of openings, with the openings of each series spaced in one direction in accordance with the spacing of the series of indicia on said first member and offset from each other in the other direction, and with corresponding openings of each series spaced in accordance with the spacing of said openings in said second member; means associated with all said members to enable relative movement and adjustment thereof, said second and intermediate members being relatively adjustable for selectively registering the said other opening in said second member with indicia on said intermediate member relating to one of the series of indicia on said first member and for aligning one of the offset openings in each of the series in said intermediate member with a corresponding opening in said second member to restrict observation of data on said first member through said openings in said second member to the indicia-series that corresponds to the indicia on said intermediate member that is registered with and observable through said other opening in said second member, said second and intermediate members including means for retaining them in the selectively registered adjustment.

8. A device for simultaneously selecting a plurality of functionally related indicia from a mass of indicia comprising a member bearing indicia arranged in a plurality of spaced series; a second member superimposed on said first member and formed with a plurality of non-contiguously spaced openings extending across all said series of indicia for registration with indicia in all said series at a plurality of non-contiguous points in each of said series on said first member, and also provided with another opening for selective registration with other indicia individually related to the respective indicia-series on said first member; a member positioned intermediate said first and second members and bearing the said indicia related to said respective series disposed thereon to be viewed through said other opening in said second member and formed with a plurality of series of openings, with the openings of each series spaced in one direction in accordance with the spacing of the series of indicia on said first member and offset from each other in the other direction, and with corresponding openings of each series spaced in accordance with the spacing of said openings in said second member; means associated with all said members to enable relative movement and adjustment thereof, said second and intermediate members being relatively adjustable for selectively registering the said other opening in said second member with indicia on said intermediate member relating to one of the series of indicia on said first member and for aligning one of the offset openings in each of the series in said intermediate member with a corresponding opening in said second member to restrict observation of data on said first member through said openings in said second member to the indicia-series that corresponds to the indicia on said intermediate member that is registered with and observable through said other opening in said second member, said second member being provided with a plurality of locking openings and said second first member being provided with a slot; and a stud carried by said intermediate member and selectively engageable in the locking openings of said second member for holding said second and intermediate members in their adjusted positions and engageable in the slot in said first member for limiting the movement of the latter relatively to said other members to prevent registration with the openings in said members of indicia not related thereto.

9. A bid-test indicator comprising a chart carrying indicia representing a plurality of "bids" for each player of the several "hands" of a number of different card "deals", all of the "bid" indicia for a particular "deal" being arranged in a circumferential series on said chart with the several series in concentric relation and "bid" indicia for each "player" for all of the "deals" being disposed in radial alignment; another member superimposed on said chart and formed with a plurality of radially extending openings spaced to represent the stations of the several players and each disposed to be brought into coincidence with radially aligned indicia on said chart designating "bids" for each of the "deals", said member being also provided with an aperture for viewing indicia designating "dealt cards", all of said superimposed member extending over said chart so that the indicia on the chart are visible only through said openings, and a member disposed intermediate said other members and bearing the indicia designating "dealt cards" disposed thereon to be viewed through said opening in the uppermost member and being formed with a plurality of concentrically disposed series of circumferentially arranged openings disposed to selectively register with the radial openings in said uppermost member for viewing therethrough single "bids" of the radial groups aligned with the radial openings at each player's position, said intermediate member being adjustable relatively to said uppermost member to limit observation through all the radial openings to a single circumferential series of indicia on said chart that corresponds to the dealt-card indicia on said intermediate member which is adjustably aligned with said other opening in said uppermost member for restricting the indicia of said chart observable through any one of the radial openings in said uppermost member to that bid, of the radial groups on said chart, which corresponds to the "deal" indicia observable on said intermediate member.

HARRY SHOKLER.